US010816989B2

(12) United States Patent
Chen et al.

(10) Patent No.: US 10,816,989 B2
(45) Date of Patent: Oct. 27, 2020

(54) METHODS AND SYSTEMS OF DISTRIBUTING TASK AREAS FOR CLEANING DEVICES, AND CLEANING DEVICES

(71) Applicant: Quanta Computer Inc., Taoyuan (TW)

(72) Inventors: Yu-Ching Chen, Taoyuan (TW);
Tao-Chih Hsu, Taoyuan (TW);
Yang-Sheng Wang, Taoyuan (TW);
Chun-Ting Chen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 130 days.

(21) Appl. No.: 16/180,237

(22) Filed: Nov. 5, 2018

(65) Prior Publication Data

US 2020/0004258 A1    Jan. 2, 2020

(30) Foreign Application Priority Data

Jun. 27, 2018   (TW) .............................. 107122068 A

(51) Int. Cl.
*G05D 1/02* (2020.01)
*B25J 9/00* (2006.01)

(52) U.S. Cl.
CPC .......... *G05D 1/0219* (2013.01); *B25J 9/0003* (2013.01); *G05D 1/0217* (2013.01); *G05D 2201/0203* (2013.01); *G05D 2201/0215* (2013.01)

(58) Field of Classification Search
CPC .. A47L 11/4011; B25J 9/0003; G05D 1/0217; G05D 1/0219; G05D 1/0274; G05D 2201/0203; G05D 2201/0215
See application file for complete search history.

(56) References Cited

U.S. PATENT DOCUMENTS

| | | | | |
|---|---|---|---|---|
| 5,247,608 A * | 9/1993 | Flemming | ............ | B25J 9/1676 |
| | | | | 700/255 |
| 6,389,329 B1 * | 5/2002 | Colens | ...................... | A47L 5/30 |
| | | | | 700/262 |
| 6,690,134 B1 * | 2/2004 | Jones | ..................... | A47L 9/009 |
| | | | | 318/567 |
| 7,388,343 B2 * | 6/2008 | Jones | ................... | G05D 1/0219 |
| | | | | 318/568.12 |
| 7,389,156 B2 * | 6/2008 | Ziegler | ............. | A22C 17/0013 |
| | | | | 318/568.1 |
| 8,639,364 B2 * | 1/2014 | Stoddard | ............... | B25J 9/1669 |
| | | | | 700/14 |

(Continued)

*Primary Examiner* — Babar Sarwar
(74) *Attorney, Agent, or Firm* — McClure, Qualey & Rodack, LLP

(57) ABSTRACT

A method of distributing task areas, adapted to a cleaning device, is provided, including: receiving a task map; obtaining a shape that corresponds to the task map; dividing the task map into a plurality of sub-regions according to a plurality of recesses in the shape; merging the two adjacent sub-regions that have a common long side or short side, and obtaining a plurality of merge results that correspond to each of the merge actions; calculating a plurality of cleaning times for each of the merge results for the cleaning device; selecting the merge result that has the shortest cleaning times as a first distribution result; and enabling the cleaning device to perform a cleaning task according to the first distribution result.

6 Claims, 7 Drawing Sheets

(56) References Cited

U.S. PATENT DOCUMENTS

| | | | |
|---|---|---|---|
| 9,278,452 B2* | 3/2016 | Brandenberger | G05B 19/4061 |
| 9,329,593 B2* | 5/2016 | Izumi | G05B 19/41815 |
| 9,707,681 B2* | 7/2017 | Davidi | B25J 9/1682 |
| 10,168,709 B2* | 1/2019 | Kleiner | A47L 9/0488 |
| 2004/0181896 A1* | 9/2004 | Egawa | G05D 1/0219 |
| | | | 15/319 |
| 2005/0273200 A1* | 12/2005 | Hietmann | B25J 9/1666 |
| | | | 700/248 |
| 2011/0194755 A1* | 8/2011 | Jeong | G06K 9/00664 |
| | | | 382/153 |
| 2011/0264305 A1* | 10/2011 | Choe | G05D 1/0274 |
| | | | 701/2 |
| 2012/0215351 A1* | 8/2012 | McGee | B25J 9/1666 |
| | | | 700/248 |
| 2014/0334713 A1* | 11/2014 | Kim | G05D 1/024 |
| | | | 382/153 |
| 2014/0343783 A1* | 11/2014 | Lee | G05D 1/0011 |
| | | | 701/25 |
| 2014/0350839 A1* | 11/2014 | Pack | G05D 1/0214 |
| | | | 701/409 |
| 2015/0336269 A1* | 11/2015 | Linnell | B25J 9/1656 |
| | | | 700/245 |
| 2017/0028559 A1* | 2/2017 | Davidi | B25J 9/1682 |
| 2017/0273527 A1* | 9/2017 | Han | A47L 9/009 |
| 2018/0074508 A1* | 3/2018 | Kleiner | A47L 9/2852 |
| 2018/0267540 A1* | 9/2018 | Sonoura | G05D 1/0221 |
| 2019/0094870 A1* | 3/2019 | Afrouzi | G05D 1/0219 |
| 2019/0176321 A1* | 6/2019 | Afrouzi | G05D 1/0044 |
| 2020/0125115 A1* | 4/2020 | Hsu | G05D 1/0287 |

* cited by examiner

METHODS AND SYSTEMS OF DISTRIBUTING TASK AREAS FOR CLEANING DEVICES, AND CLEANING DEVICES

CROSS REFERENCE TO RELATED APPLICATIONS

This application claims priority of Taiwan Patent Application No. 107122068, filed on Jun. 27, 2018, the entirety of which is incorporated by reference herein.

BACKGROUND OF THE INVENTION

Field of the Invention

The present invention relates to a method and a system of distributing task areas for cleaning devices, and a cleaning device.

Description of the Related Art

While science and technology continue to advance, robots have been widely adopted for a variety of uses. However, because the region that needs to be cleaned up inside the house is usually not composed of a single rectangular shape, the existing task distribution method is to clean a fixed-size task region, and then to go on to the next task region that needs cleaning. Using this method, the cleaning device may have too many unnecessary turns, which might increase the cleaning time and adversely affect the cleaning efficiency. Therefore, how to efficiently divide the cleaning region to increase the efficiency of cleaning is a problem that needs to be solved at present.

BRIEF SUMMARY OF INVENTION

An embodiment of the present invention provides a method of distributing task areas, adapted to a cleaning device, including: receiving a task map; obtaining a shape that corresponds to the task map; dividing the task map into a plurality of sub-regions according to a plurality of recesses in the shape; merging the two adjacent sub-regions that have a common long side or a common short side, and obtaining a plurality of merge results that correspond to each of the merge actions; calculating a plurality of cleaning times for each of the merge results for the cleaning device; selecting the merge result that has the shortest cleaning times as a first distribution result; and enabling the cleaning device to perform a cleaning task according to the first distribution result.

Another embodiment of the present invention provides a system of distributing task areas, adapted to a cleaning device, including a control terminal and at least one cleaning device. The control terminal includes a first storage unit and a first processing unit. The first storage unit stores a task map. The first processing unit obtains a shape that corresponds to the task map, divides the task map into a plurality of sub-regions according to a plurality of recesses in the shape, merges the two adjacent sub-regions having a common long side or a common short side, obtains a plurality of merge results that correspond to each of the merge actions, calculates a plurality of cleaning times for each of the merge results for the cleaning device, and selects the merge result that has the shortest cleaning times as a first distribution result. The cleaning device includes a second storage unit and a second processing unit. The second storage unit stores the first distribution result received from the control terminal. The second processing unit performs a cleaning task according to the first distribution result.

Another embodiment of the present invention provides a cleaning device, including a storage unit and a processing unit. The storage unit stores a task map. The processing unit obtains a shape that corresponds to the task map, divides the task map into a plurality of sub-regions according to a plurality of recesses in the shape, merges the two adjacent sub-regions that have a common long side or a common short side, obtains a plurality of merge results that correspond to each of the merge actions, calculates a plurality of cleaning times for each of the merge results, selects the merge result that has the shortest cleaning times as a first distribution result, and performs a cleaning task according to the first distribution result.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present methods and systems of distributing task areas for cleaning devices, and cleaning devices can be applied will become apparent from the detailed description provided herein. It should be understood that the detailed description and specific examples, while indicating exemplary embodiments of the methods and the systems of distributing task areas for cleaning devices, and the cleaning devices, are intended for the purposes of illustration only and are not intended to limit the scope of the invention.

Figure 1:
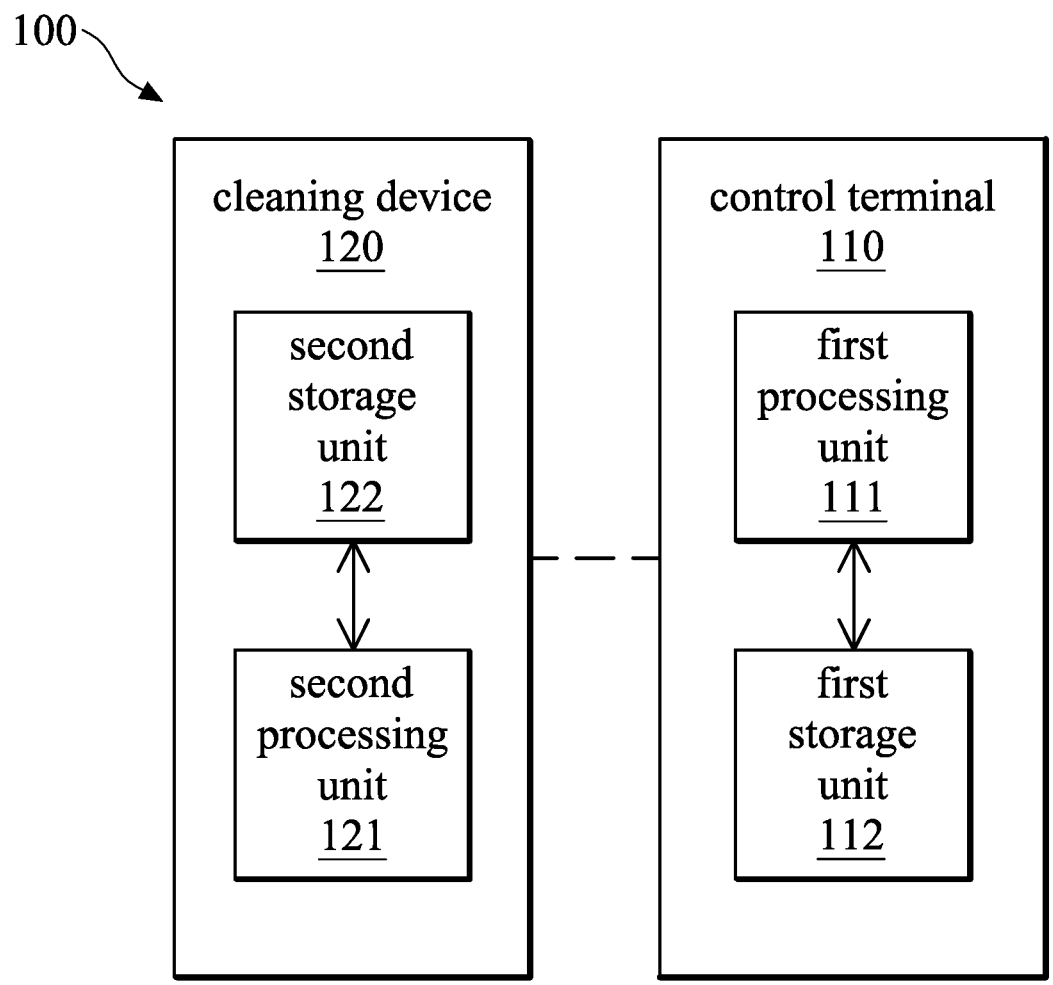
FIG. 1 is a system architecture diagram of a system of distributing task areas for cleaning devices in accordance with an embodiment of the present invention.

FIG. 1 is a system architecture diagram of a system of distributing task areas for cleaning devices in accordance with an embodiment of the present invention. The system includes a control terminal 110 and a cleaning device 120. The control terminal 110 can be implemented in an electronic device, such as a desktop computer, a notebook, a tablet computer, or a smart phone, and includes at least a first processing unit 111 and a first storage unit 112. The first processing unit 111 can be implemented in a variety of ways, for example, in a dedicated hardware circuit or general hardware, such as a single processor, a multiprocessor with parallel processing capability, a graphics processor, or another processor with computational capabilities. When the first processing unit 111 executes code or software, it performs the functions described below. The first storage unit 112 is configured to store at least one task map, task related information generated according to the task map, and the like, which are accessed by the first processing unit 111 when performing the related operation. The first storage unit 112 can be a non-volatile storage device, such as a hard disk, a flash memory, or a ROM. In addition, the control terminal 110 may further include a wireless communication interface (not shown), and the wireless communication interface can be a local area network (LAN) communication module, a wireless local area network communication module (WLAN), a Bluetooth communication module, or the like, for exchanging various signals and data with the cleaning device 120. In a specific embodiment, the cleaning device is a cleaning robot.

The cleaning device 120 includes at least a second processing unit 121 and a second storage unit 122. Similarly, the second processing unit 121 can be implemented in a variety of ways, for example, in a dedicated hardware circuit or general hardware, such as a single processor, a multiprocessor with parallel processing capability, a graphics processor, or another processor with computational capabilities, and when executing code or software, it performs the functions described below. The second storage unit 122 can be a non-volatile storage device, such as a hard disk, a flash memory, or a ROM, for storing a task map and information related to the cleaning task received from the control terminal 110. The second processing unit 121 is configured to perform the cleaning task according to the received task map or perform a calculation related to the cleaning task.

Figure 2A:
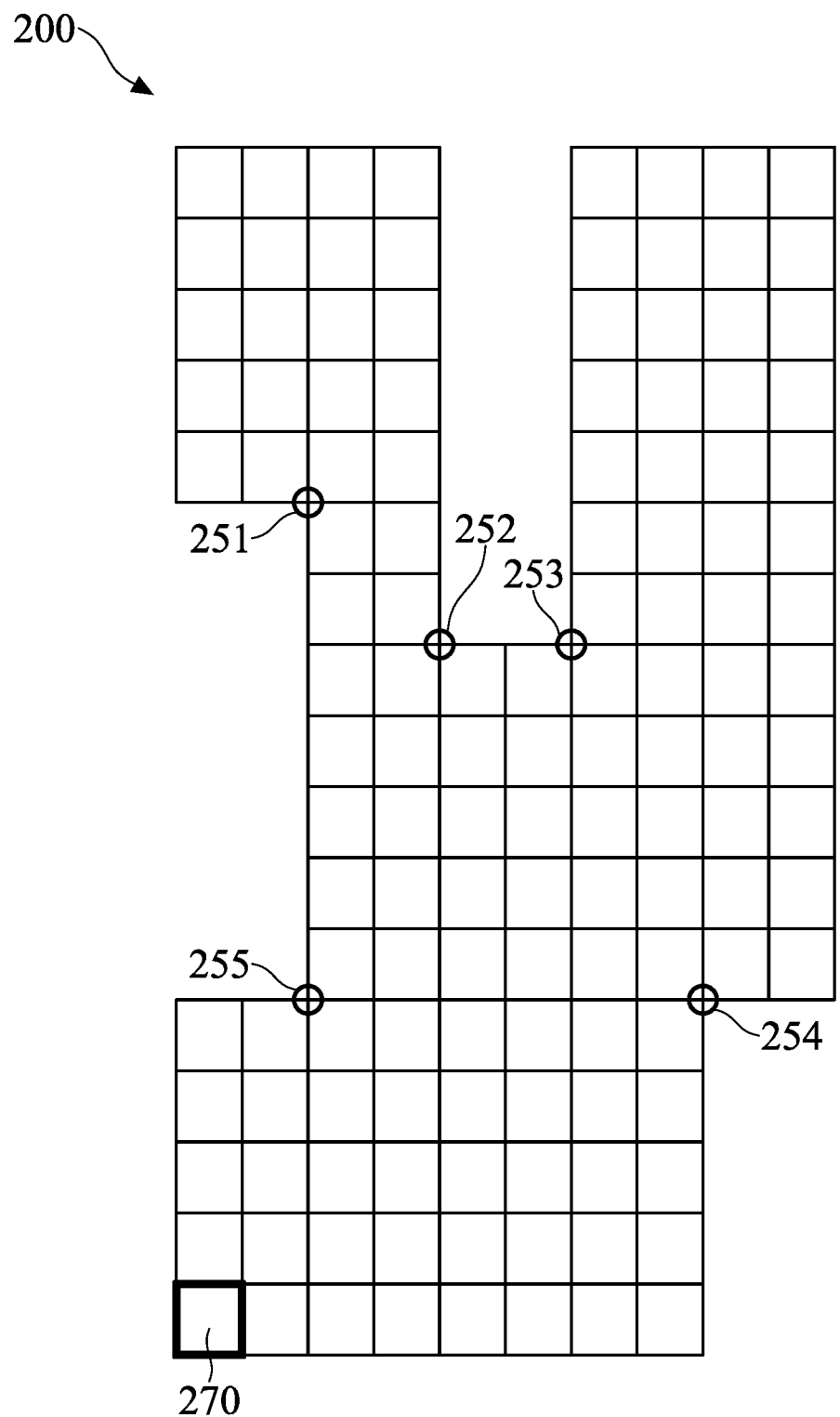
FIGS. 2A-2C are schematic diagrams of a task map and a plurality of sub-regions divided from the task map in accordance with an embodiment of the present invention.
Figure 2B:
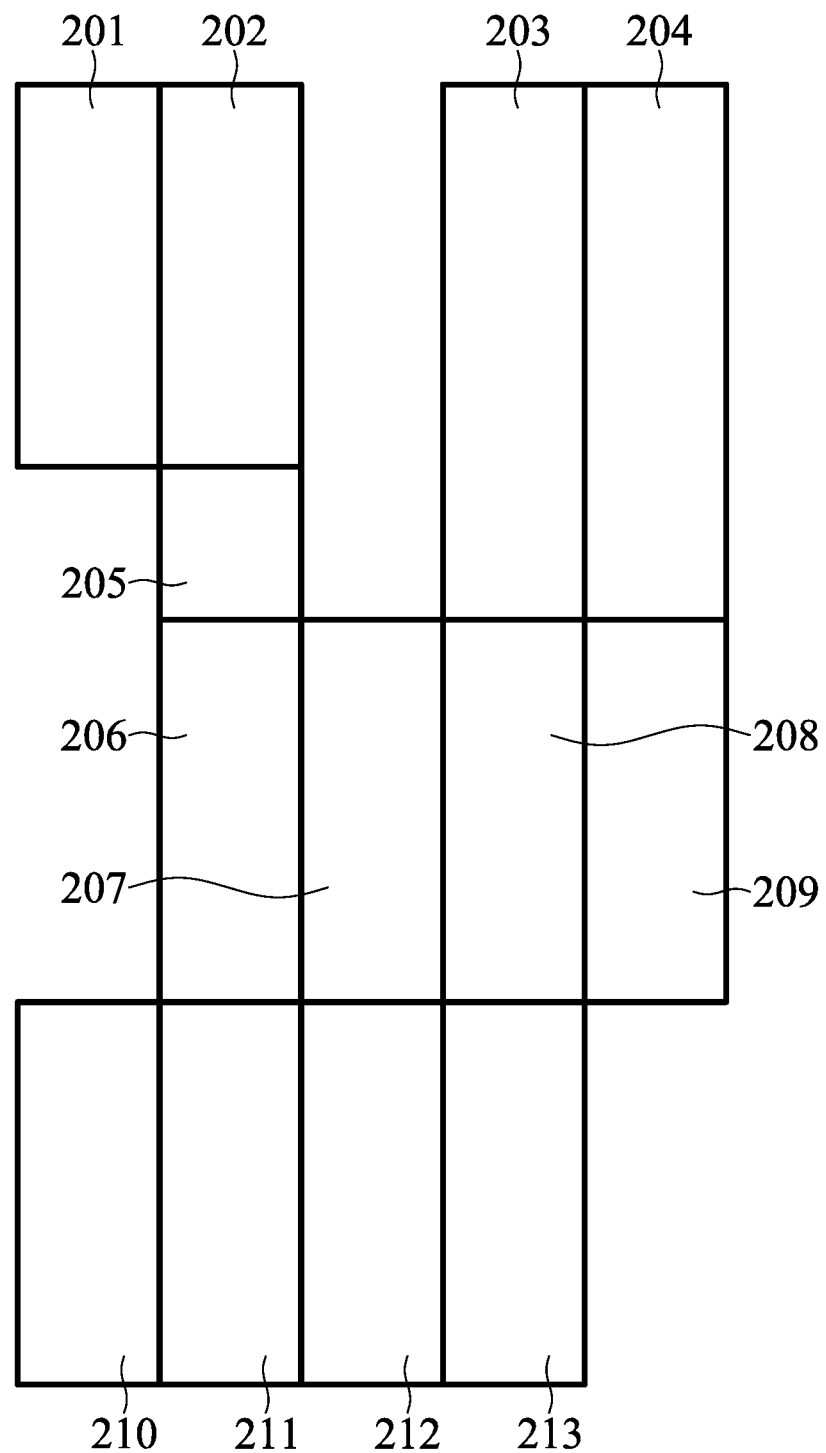
Figure 2C:
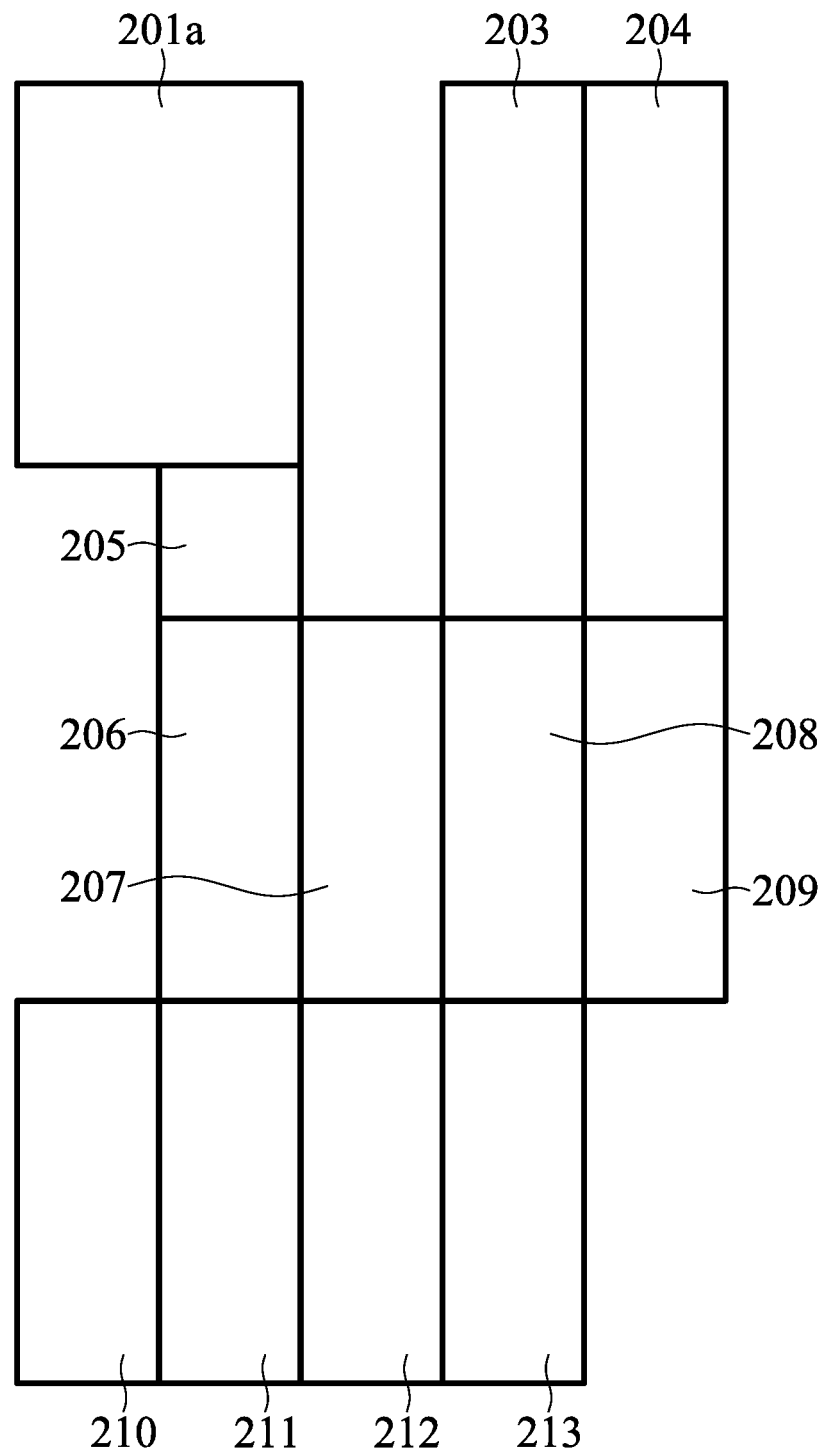

FIGS. 2A-2C are schematic diagrams of a task map and a plurality of sub-regions divided from the task map in accordance with an embodiment of the present invention. According to an embodiment of the present invention, after the first processing unit 111 of the control terminal 110 receives the task map 200 (as shown in FIG. 2A), the first processing unit 111 first obtains the shapes of the task map 200, and obtains each of the recesses in the task map 200 (the recesses 251-255 shown in the FIG. 2A) to perform the subsequent sub-region dividing operation. The block 270 shown in FIG. 2A represents the minimum cleaning unit of the cleaning device 120, and it is used to estimate the time required to clean each sub-region. Next, the first processing unit 111 divides the task map 200 into a plurality of sub-regions based on the recesses. For example, a plurality of sub-regions 201-213 as shown in FIG. 2B can be obtained after longitudinally and horizontally dividing with the recesses 251-255 shown in FIG. 2A.

After obtaining the plurality of sub-regions 201-213, the first processing unit 111 further merges two adjacent sub-regions having the common long side or the common short side, and after merging, the first processing unit 111 further calculates a cleaning time corresponding to each of the merged sub-regions. For example, as shown in FIG. 2B, because the sub-regions 201, 202 have the common long side, the first processing unit 111 merges the sub-regions 201, 202 into another larger sub-region 201a as shown in FIG. 2C (referred as a first merge result), and calculate the time required to clean up the sub-region 201a. Likewise, because the sub-regions 202, 205 have the common short side, the first processing unit 111 merges the sub-regions 202, 205 (referred as a second merge result), and calculates the time required to clean up the merged sub-regions. And so on, after the first processing unit 111 calculates the time required to clean up each of the merge results, the top three with the shortest time will be selected to perform the second merge, and the above process will be repeated until all merged sub-regions do not have the common long side or the common short side. Finally, the first processing unit 111 selects the merge result corresponding to one of the shortest cleaning times as the first distribution result.

Figure 3A:
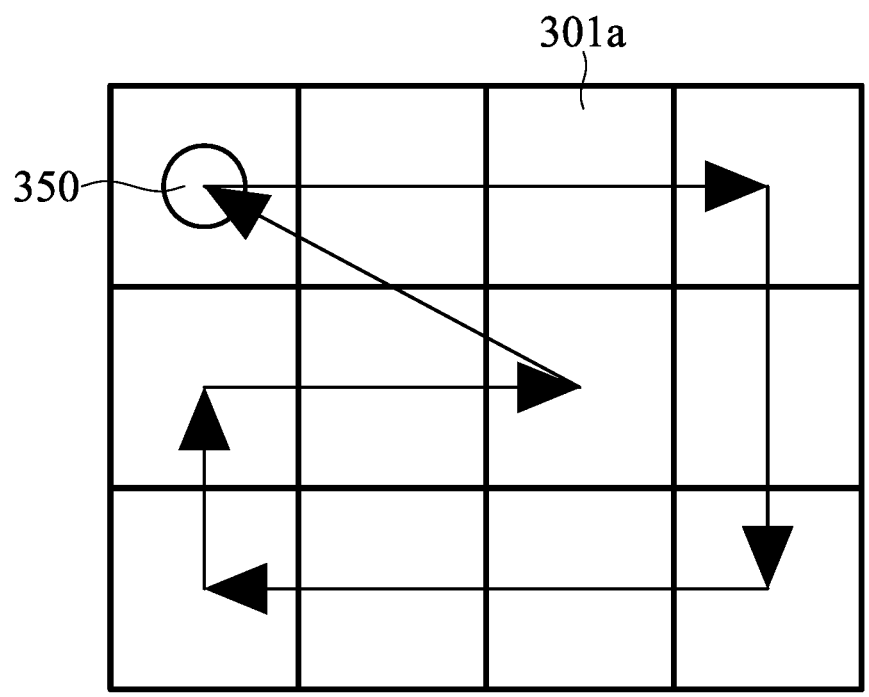
FIGS. 3A and 3B are schematic diagrams of cleaning paths of a cleaning device in accordance with an embodiment of the present invention.
Figure 3B:
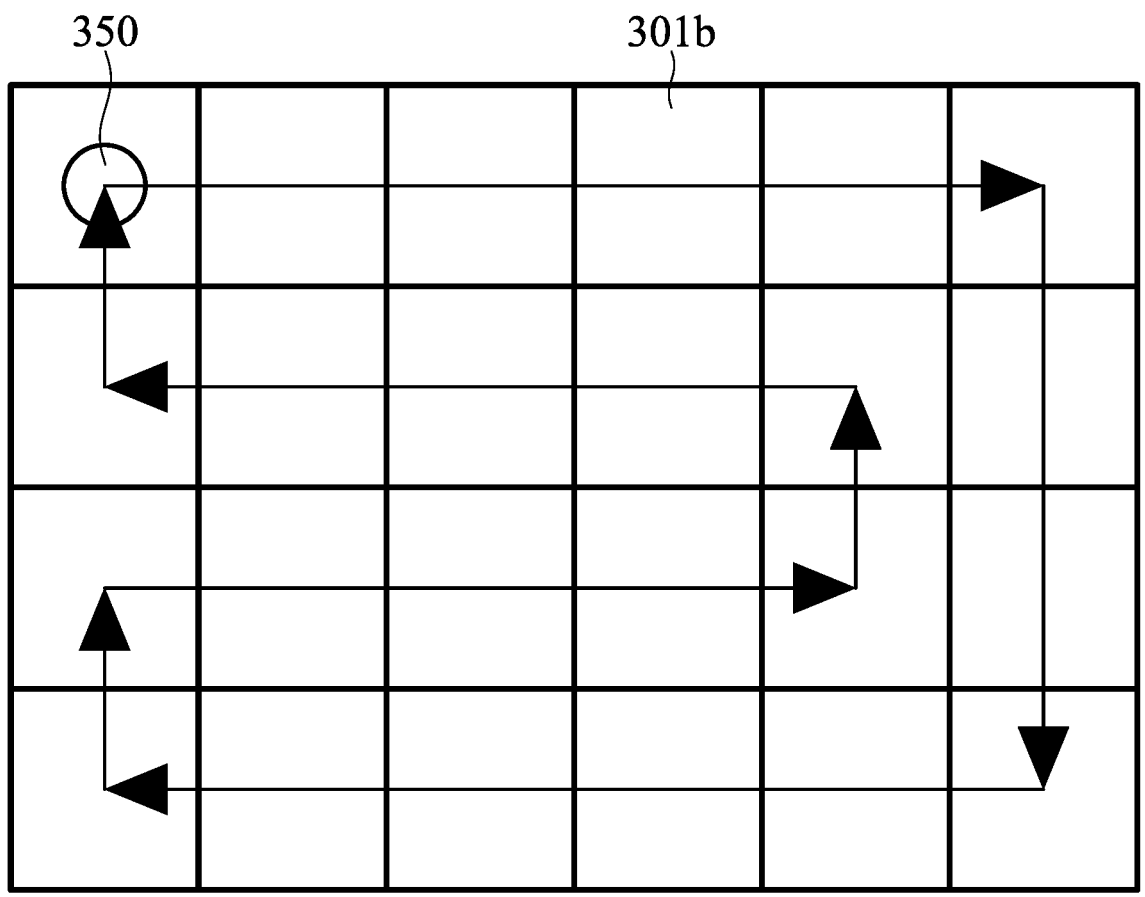

FIGS. 3A and 3B are schematic diagrams of cleaning paths of a cleaning device in accordance with an embodiment of the present invention. Because the time required for the cleaning device to clean up the minimum cleaning unit is less than the time required for the turn, the cleaning device will minimize the number of turns when cleaning up the sub-region. In some embodiments of the invention, the sub-region is cleaned up by moving along the long side to minimize the number of turns. For example, as shown in FIG. 3A, the size of the sub-region 301a is 4*3. The cleaning device starts from a starting point 350 and is moved along the long side of the sub-region 301a until it moves to the upper right corner of the sub-region 301a. Next, the cleaning device turns 90 degrees, and moves forward to the bottom right corner of the sub-region 301a (i.e. two cleaning unit), and so on. Finally, after the cleaning device returns to the starting point 350 along the path shown in FIG. 3A, the cleaning of the sub-region 301a is completed. According to the path described above, when the number of cleaning units on the short side of the sub-region is odd, the time required to clean up the sub-region is about:

$$T_{total}=2XT+XYL+RL$$

$$R=\sqrt{1+(Y-2)^2}-1$$

Where $T_{total}$ is the time required to clean up the sub-region, X is the number of cleaning units on the short side, Y is the number of cleaning units on the long side, T is the time required for the cleaning device to turn, and L is the time required to clean up the cleaning unit. In addition, when the long side of the sub-region is longer, R is approximately equal to Y−2.

FIG. 3B is a schematic diagrams of another cleaning path of the cleaning device in accordance with another embodiment of the present invention. Compared to the sub-region 301a, the short side of the sub-region 301b is an even number, so that when the cleaning device wants to return to the starting point 350, it can move parallel to the long side. For example, as shown in FIG. 3B, in order to clean up the sub-region 301b, the size that the cleaning device needs to clean up is 6*4 of the cleaning units and the number of turns is 8. Similarly, according to the path described above, when the number of cleaning units on the short side of the sub-region is even, the time required to clean up the sub-region is:

$$T_{total}=2XT+XYL$$

Similarly, where $T_{total}$ is the time required to clean up the sub-region, X is the number of cleaning units on the short side, Y is the number of cleaning units on the long side, T is the time required for the cleaning device to turn, and L is the time required to clean up the cleaning unit.

As shown below, Table 1 shows the time required to clean up various sizes of the sub-regions in accordance with some embodiments of the present invention. Where the cleaning time shown in Table a can be obtained according to two formulas described above.

TABLE 1

| the size of the sub-region | The time required to complete the cleaning task and return to the starting point |
|---|---|
| 2 * 2 | 4T + 4L |
| 2 * 3 | 4T + 6L |
| 3 * 3 | 6T + 8L + $\sqrt{1+(3-2)^2}$ * L |
| 3 * 4 | 6T + 11L + $\sqrt{1+(4-2)^2}$ * L |
| 4 * 4 | 8T + 16L |
| 4 * 5 | 8T + 20L |

TABLE 1-continued

| the size of the sub-region | The time required to complete the cleaning task and return to the starting point |
|---|---|
| 4 * 6 | 8T + 24L |
| 5 * 5 | 10T + 24L + $\sqrt{1+(5-2)^2}$ * L |

It should be noted that the dividing of the task map and the merging of the sub-regions can also be performed by the second processing unit 121 of the cleaning device 120, that is, the cleaning device 120 can downloads the task map directly from the control terminal 110 and performs the related calculations.

Figure 4:
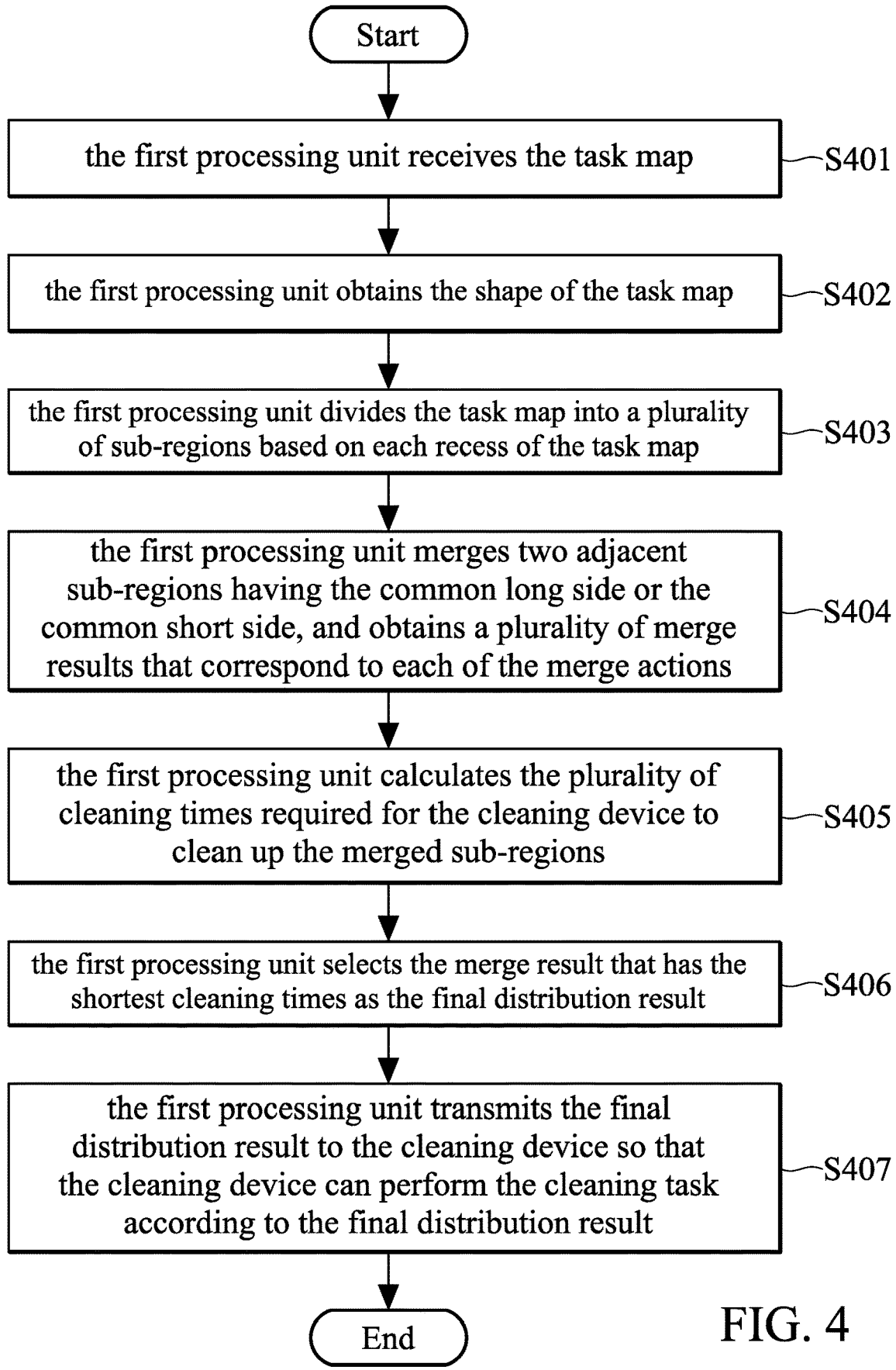
FIG. 4 is a flow chart of a method of distributing task areas for cleaning devices in accordance with an embodiment of the present invention.

FIG. 4 is a flow chart of a method of distributing task areas for cleaning devices in accordance with an embodiment of the present invention. At step S401, the first processing unit 111 receives the task map. At step S402, the first processing unit 111 obtains the shape of the task map. At step S403, the first processing unit 111 obtains a plurality of recesses according to the shape of the task map, and the task map is divided into a plurality of sub-regions longitudinally and horizontally based on each recess of the task map. At step S404, after obtaining the plurality of sub-regions, the first processing unit 111 further merges two adjacent sub-regions having the common long side or the common short side, and respectively calculates the corresponding cleaning time according to each merged sub-region. At step S405, the first processing unit 111 further calculates the plurality of cleaning times required for the cleaning device to clean up the merged sub-regions, and selects the merge result that has the shortest cleaning times as the final distribution result (step S406). Finally, at step S407, the first processing unit 111 transmits the final distribution result to the cleaning device so that the cleaning device can perform the cleaning task according to the final distribution result.

The methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

As described above, according to the embodiments of the automatic charging system for robots and the method thereof, when the cleaning device receives the task map with irregular shape, the task map can efficiently divided into the plurality of task sub-regions based on the technical means described in the present invention to significantly improve the efficiency of cleaning.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A method of distributing task areas, adapted to a cleaning device, comprising:
   receiving a task map;
   obtaining a shape that corresponds to the task map;
   dividing the task map into a plurality of sub-regions according to a plurality of recesses in the shape;
   merging the two adjacent sub-regions that have a common long side or short side, and obtaining a plurality of merge results that correspond to each of the merge actions;
   calculating a plurality of cleaning times for each of the merge results for the cleaning device;
   selecting the merge result that has the shortest cleaning times as a first distribution result;
   enabling the cleaning device to perform a cleaning task according to the first distribution result.

2. The method as claimed in claim 1, further comprising:
   calculating the cleaning time according to a first formula or a second formula according to the number of cleaning units on the short side of the sub-region;
   wherein when the number of cleaning units on the short side is an odd number, the cleaning time is calculated using the first formula, and the first formula is expressed as:

$T_{total} = 2XT + (XY-1)L + \sqrt{1+(Y-2)^2} * L$ wherein when the number of cleaning units on the short side is an even number, the cleaning time is calculated using the second formula, and the second formula is expressed as:

$T_{total} = 2XT + XYL$ wherein $T_{total}$ is the cleaning time, X is the number of cleaning units on the short sides, Y is the number of cleaning units on the long side, T is the time required for the cleaning device to turn, and L is the time required for the cleaning device to clean one cleaning unit.

3. A system of distributing task areas, adapted to a cleaning device, comprising:
   a control terminal, comprising:
   a first storage unit, storing a task map;
   a first processing unit for:
   obtaining a shape that corresponds to the task map;
   dividing the task map into a plurality of sub-regions according to a plurality of recesses in the shape;
   merging the two adjacent sub-regions that have a common long side or short side, and obtaining a plurality of merge results that correspond to each of the merge actions;
   calculating a plurality of cleaning times for each of the merge results for the cleaning device;
   selecting the merge result that has the shortest cleaning times as a first distribution result; and
   at least one cleaning device, comprising:
   a second storage unit, storing the first distribution result received from the control terminal;
   a second processing unit, performing a cleaning task according to the first distribution result.

4. The system as claimed in claim 3, wherein:
   the first processing unit further calculates the cleaning time according to a first formula or a second formula according to the number of cleaning units on the short side of the sub-region;

when the number of cleaning units on the short side is an odd number, the cleaning time is calculated using the first formula, and the first formula is expressed as:

$$T_{total}=2XT+(XY-1)L+\sqrt{1+(Y-2)^2}*L$$

wherein when the number of cleaning units on the short side is an even number, the cleaning time is calculated using the second formula, and the second formula is expressed as:

$$T_{total}=2XT+XYL$$

wherein $T_{total}$ is the cleaning time, X is the number of cleaning units on the short sides, Y is the number of cleaning units on the long side, T is the time required for the cleaning device to turn, and L is the time required for the cleaning device to clean one cleaning unit.

5. A cleaning device, comprising:
a storage unit, storing a task map;
a processing unit for:
obtaining a shape that corresponds to the task map;
dividing the task map into a plurality of sub-regions according to a plurality of recesses in the shape;
merging the two adjacent sub-regions that have a common long side or short side, and obtaining a plurality of merge results that correspond to each of the merge actions;
calculating a plurality of cleaning times for each of the merge results;
selecting the merge result that has the shortest cleaning times as a first distribution result; and
performing a cleaning task according to the first distribution result.

6. The cleaning device as claimed in claim 5, wherein:
the processing unit further calculates the cleaning time according to a first formula or a second formula according to the number of cleaning units on the short side of the sub-region;
when the number of cleaning units on the short side is an odd number, the cleaning time is calculated using the first formula, and the first formula is expressed as:

$$T_{total}=2XT+(XY-1)L+\sqrt{1+(Y-2)^2}*L$$

wherein when the number of cleaning units on the short side is an even number, the cleaning time is calculated using the second formula, and the second formula is expressed as:

$$T_{total}=2XT+XYL$$

wherein $T_{total}$ is the cleaning time, X is the number of cleaning units on the short sides, Y is the number of cleaning units on the long side, T is the time required for the cleaning device to turn, and L is the time required for the cleaning device to clean one cleaning unit.

* * * * *